(No Model.)
C. WOLFF.
MACHINE FOR REDUCING FEATHERS.
No. 388,517. Patented Aug. 28, 1888.
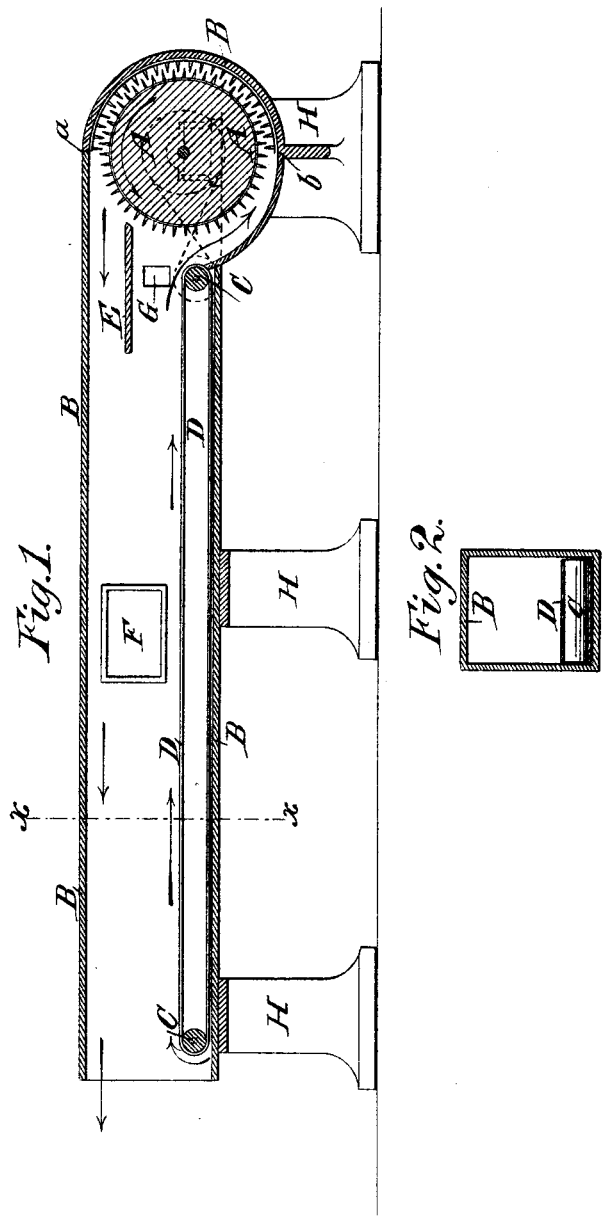
Witnesses.
Emil Herter
O. Sundgren
Inventor.
Cäsar Wolff.
by attorneys
Brown & Seall.

United States Patent Office.

CÄSAR WOLFF, OF FRANKFORT-ON-THE-MAIN, GERMANY.

MACHINE FOR REDUCING FEATHERS.

SPECIFICATION forming part of Letters Patent No. 388,517, dated August 28, 1888.

Application filed September 3, 1887. Serial No. 248,708. (No model.)

*To all whom it may concern:*

Be it known that I, CÄSAR WOLFF, a subject of the Emperor of Germany, and resident at Frankfort-on-the-Main, Germany, have invented a new and useful Improvement in Machines for Reducing Feathers, of which the following is a specification.

This invention has for its object to enable wing and tail feathers, which have heretofore only been used for manuring purposes, to not only be stripped of their barbs, but also to have their quills and shafts reduced in such manner that nearly the whole can be utilized in the production of upholstering or cushioning material, bed-feathers, and the like.

The invention consists in the combination of a rotary toothed drum, a stationary casing therefor containing a toothed concave, within which said drum works, a trunk or channel connected with or forming a prolongation of said casing, and an endless apron arranged in said trunk or channel and having its upper surface moving toward the drum. In such a machine the stripping and reduction are effected between the toothed drum and concave, and the stripped and reduced material is driven through the trunk or channel by the fan-blower-like action of the drum, and when sufficiently reduced is expelled from the machine, while the heavier parts, which have not been sufficiently reduced during the first passage through the concave, are deposited on the apron and are automatically caused to return again and again, if required, until they have been sufficiently reduced to be ejected from the machine by the blast of air from the drum.

In the accompanying drawings, Figure 1 represents a central longitudinal section of a machine embodying my invention. Fig. 2 represents a transverse section in the line *x x*, Fig. 1.

Similar letters of reference designate corresponding parts in both figures.

B designates the casing, supported on standards H H, and resembling in form the casing of an ordinary fan-blower with its spout prolonged to form a long horizontal trunk or channel, within the lower part of which is arranged the endless apron D and the rollers C C for supporting and carrying it. A is the rotary stripping and reducing drum, furnished on its periphery with steel teeth and arranged within the blower-like head of the casing B, wherein it is supported by suitable bearings outside. The concave *a b* of the casing B, which conforms to the drum, is provided with teeth like those of the drum, to act in combination with the latter to produce the stripping and reducing operation.

Within the upper part of the casing B, in front of and near the drum, is a horizontal partition, E, below which an opening, G, is provided in each side of the casing for the entrance of air to the casing, such partition serving to separate the incoming air from the strong current of air which is produced through the long horizontal trunk or channel of the casing B by the fan-like action produced by the toothed drum, which, it may be here stated, may be driven at a velocity of about one thousand revolutions per minute.

The endless apron may be driven by any suitable means in such direction that its upper part moves toward the toothed drum.

At about the middle of the length of the apron and of the horizontal trunk or channel of the casing an opening, F, is provided in either side of the trunk or casing for the feeding-in of the feathers.

In the operation of the machine the feathers to be stripped and reduced are carried by the apron to the toothed drum, and by the rotation of the latter are carried into the toothed concave, between whose teeth and those of the drum the barbs of the feathers are stripped off and the quills and shafts thereof torn up or reduced. The stripped and reduced material coming from between the drum and concave and blown over the apron by the fan-like action of the drum are carried forward by the blast or current of air in such manner that the stripped and sufficiently-reduced parts, which are the lightest, pass out from the trunk, to be collected in any suitable receptacle, while the fragments not yet reduced fall by reason of their greater weight upon the apron, and thereby are again and again carried back to the drum until they have been reduced to the necessary degree of fineness which permits them to be blown out from the trunk. In the meantime the feeding of fresh feathers through the opening or openings F goes on continually, and may be performed either by hand or by any conveyer.

The length of the horizontal trunk and of the endless apron may be varied according to or increased in proportion to the degree of fineness of reduction to be obtained.

This machine is intended so to tear up the whole of the quills and shafts of the feathers and to leave no residuum in the machine; but any parts which should fail to be sufficiently reduced may be removed from the apron, after the stoppage of the machine, either through the side openings, F, of the trunk or at the mouth of the trunk.

The reduced material blown from the trunk may be in some degree sorted automatically by the finer and lighter portions being blown farther out of the trunk and the coarser and heavier portions being deposited nearer the trunk.

What I claim as my invention is—

1. The combination, in a machine for stripping feathers, of a rotary toothed picking and blowing drum, a stationary casing, within which said drum works and which is furnished with an internal toothed concave, an endless apron arranged to move toward said drum, and a trunk which forms a prolongation of said casing and in which there is an opening above the apron, but distant from the drum, for the introduction of the feathers, substantially as herein described.

2. The combination, with the rotary toothed drum A and the endless apron C, of the casing B, containing said drum and apron, and furnished with a toothed concave, a b, conforming to said drum, and provided with the openings F G and partition E, substantially as herein described, and for the purpose set forth.

In testimony whereof I have signed my name to this specification in the presence of two subscribing witnesses.

CÄSAR WOLFF.

Witnesses:
FRANZ HAPLUCHER,
JOSEPH PATRICK.